US011775028B2

(12) United States Patent
Chen et al.

(10) Patent No.: US 11,775,028 B2
(45) Date of Patent: Oct. 3, 2023

(54) FOLDABLE ELECTRONIC DEVICE

(71) Applicant: ASUSTeK COMPUTER INC., Taipei (TW)

(72) Inventors: Po-Nien Chen, Taipei (TW); Yi-Ting Chen, Taipei (TW); Tsung-Ju Chiang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/667,555

(22) Filed: Feb. 9, 2022

(65) Prior Publication Data

US 2022/0350375 A1    Nov. 3, 2022

(30) Foreign Application Priority Data

May 3, 2021    (TW) .................................. 110115950

(51) Int. Cl.
*G06F 1/16*    (2006.01)

(52) U.S. Cl.
CPC .......... *G06F 1/1681* (2013.01); *G06F 1/1616* (2013.01)

(58) Field of Classification Search
None
See application file for complete search history.

(56) References Cited

U.S. PATENT DOCUMENTS

| 5,220,708 A * | 6/1993 | Lucas ..................... E06B 7/367 |
| | | 16/225 |
| 6,930,881 B2 * | 8/2005 | Karidis ................. G06F 1/1616 |
| | | 361/679.55 |
| 10,895,894 B2 | 1/2021 | Jan et al. |
| 11,016,541 B2 | 5/2021 | Lin et al. |
| 11,051,413 B2 * | 6/2021 | Yang ..................... G06F 1/1624 |
| 11,550,358 B2 * | 1/2023 | Cheng ................... G06F 1/1637 |
| 11,561,588 B2 * | 1/2023 | Hsu ........................ G06F 1/169 |
| 11,567,543 B2 * | 1/2023 | Siddiqui ............... G06F 1/1681 |
| 2019/0166703 A1 * | 5/2019 | Kim ....................... G06F 1/1652 |
| 2020/0409427 A1 * | 12/2020 | Hsu ........................... E05D 1/04 |

FOREIGN PATENT DOCUMENTS

| CN | 102622053 | 8/2012 |
| CN | 111385984 | 7/2020 |
| TW | M553782 | 1/2018 |
| TW | I718784 | 2/2021 |

* cited by examiner

*Primary Examiner* — Anthony Q Edwards
*Assistant Examiner* — Rashen E Morrison
(74) *Attorney, Agent, or Firm* — JCIPRNET

(57) ABSTRACT

A foldable electronic device is disclosed and includes a first body, a second body, a hinge mechanism, and a cover. The hinge mechanism includes a first rack plate disposed to the first body, a second rack plate disposed to the second body, a first gear shaft meshed with the first rack plate, and a second gear shaft meshed with the second rack plate and the first gear shaft. The cover is movably disposed on the hinge mechanism and covers the hinge mechanism. When the second body rotates relative to the first body, the second rack plate, the second gear shaft, the first gear shaft and the first rack plate rotate in sequence, the first rack plate and the second rack plate abut against the cover, so the cover is away from the hinge mechanism and separated from the first body and the second body.

10 Claims, 20 Drawing Sheets

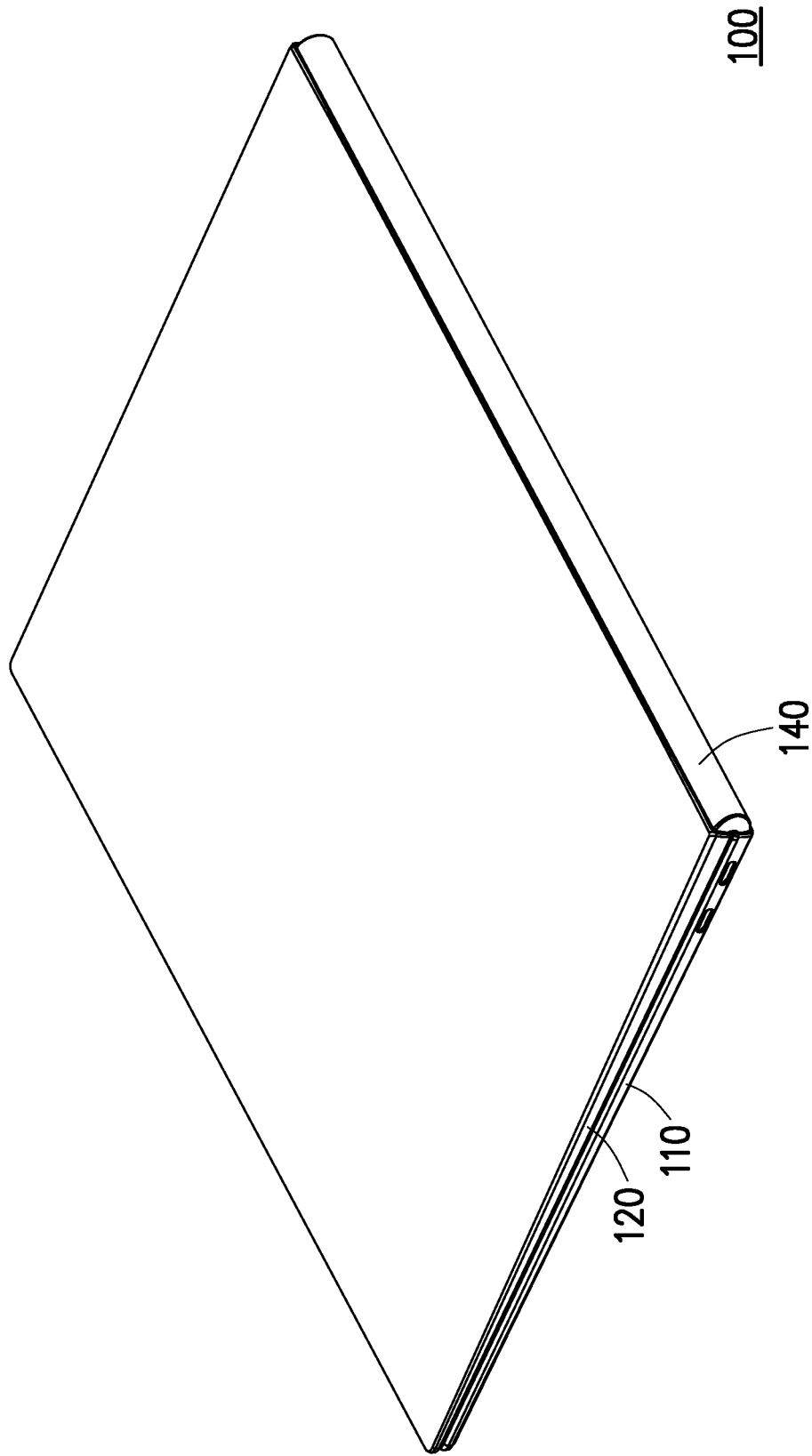

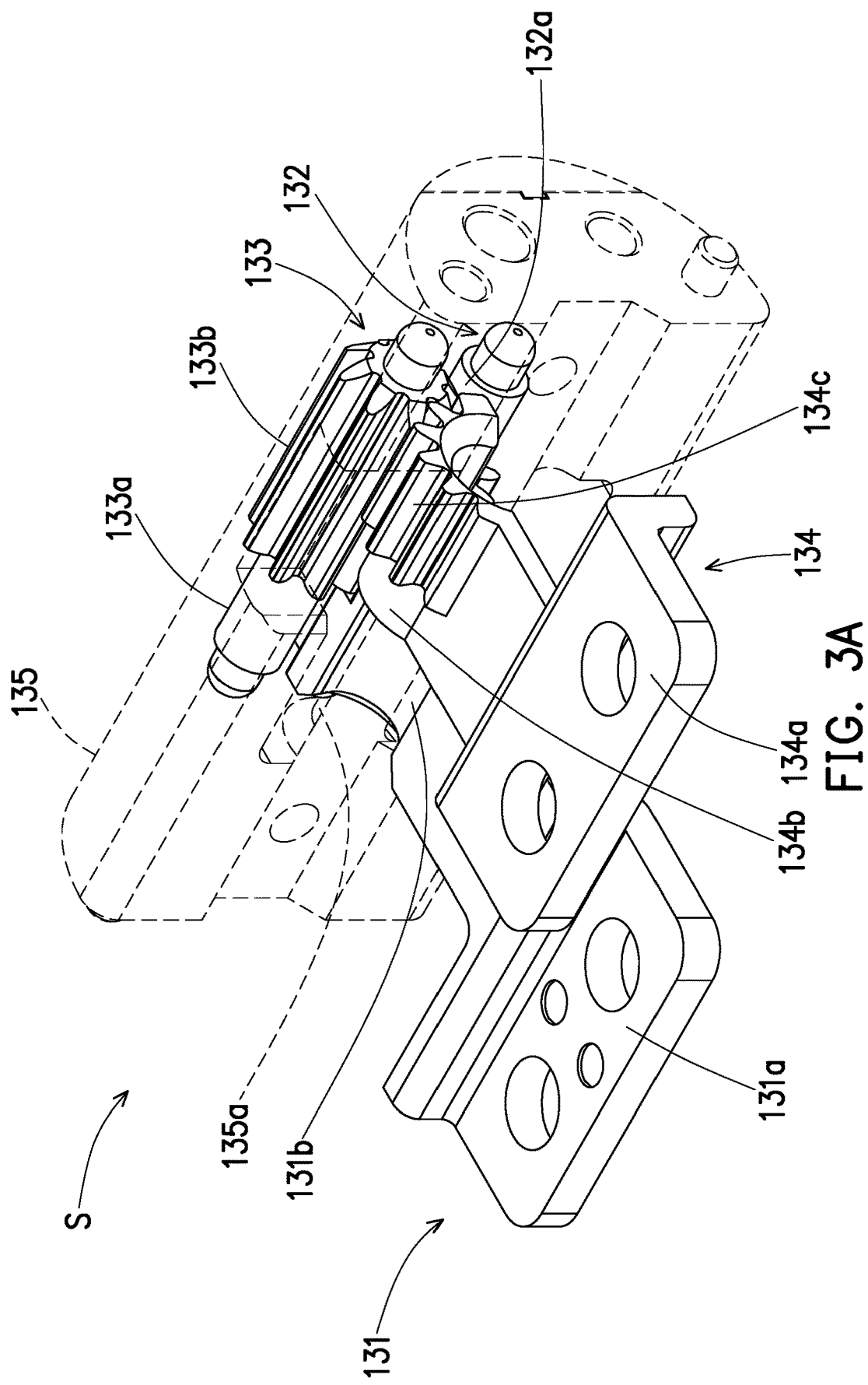

FOLDABLE ELECTRONIC DEVICE

CROSS-REFERENCE TO RELATED APPLICATION

This application claims the priority benefit of Taiwan application serial no. 110115950, filed on May 3, 2021. The entirety of the above-mentioned patent application is hereby incorporated by reference herein and made a part of this specification.

BACKGROUND

Technology Field

The disclosure relates to an electronic device, and more specifically, to a foldable electronic device.

Description of Related Art

Currently, two bodies of an electronic device (such as a dual-screen smart phone or a dual-screen laptop computer) are pivotally connected to each other through a hinge mechanism. Moreover, the hinge mechanism is accommodated in the two bodies, which affects not only the thickness and the aesthetics of the two bodies but also the strength of the casing when the two bodies are in a closed state.

SUMMARY

A foldable electronic device in the disclosure includes a first body, a second body, a hinge mechanism, and a cover. The hinge mechanism is disposed between the first body and the second body and includes a first rack plate, a second rack plate, a first gear shaft, and a second gear shaft. The first rack plate is disposed on the first body. The second rack plate is disposed on the second body and aligned with the first rack plate.

The cover is movably disposed on the hinge mechanism, covers the hinge mechanism, and abuts against the first body and the second body. When the second body rotates relative to the first body, the second rack plate, the second gear shaft, the first gear shaft, and the first rack plate rotate in sequence, the first rack plate and the second rack plate abut against the cover, so the cover is away from the hinge mechanism and separated from the first body and the second body.

Through the structural spatial changes when the first body and the second body rotate and when the cover is pushed away from the hinge mechanism, it has the advantage of space utilization for reducing the overall thickness of the foldable electronic device. Moreover, the cover of the disclosure covers the hinge mechanism, which not only increases the aesthetics of the foldable electronic device but also provides support for the first body and the second body when the cover abuts against the first body and the second body, thereby improving the strength of the foldable electronic device.

BRIEF DESCRIPTION OF THE DRAWINGS

FIG. 1A is a perspective schematic view illustrating a foldable electronic device in one mode according to an embodiment of the disclosure.

FIG. 3A is a perspective schematic view illustrating part of elements of a hinge mechanism in FIG. 1A.

DESCRIPTION OF THE EMBODIMENTS

Figure 1B:
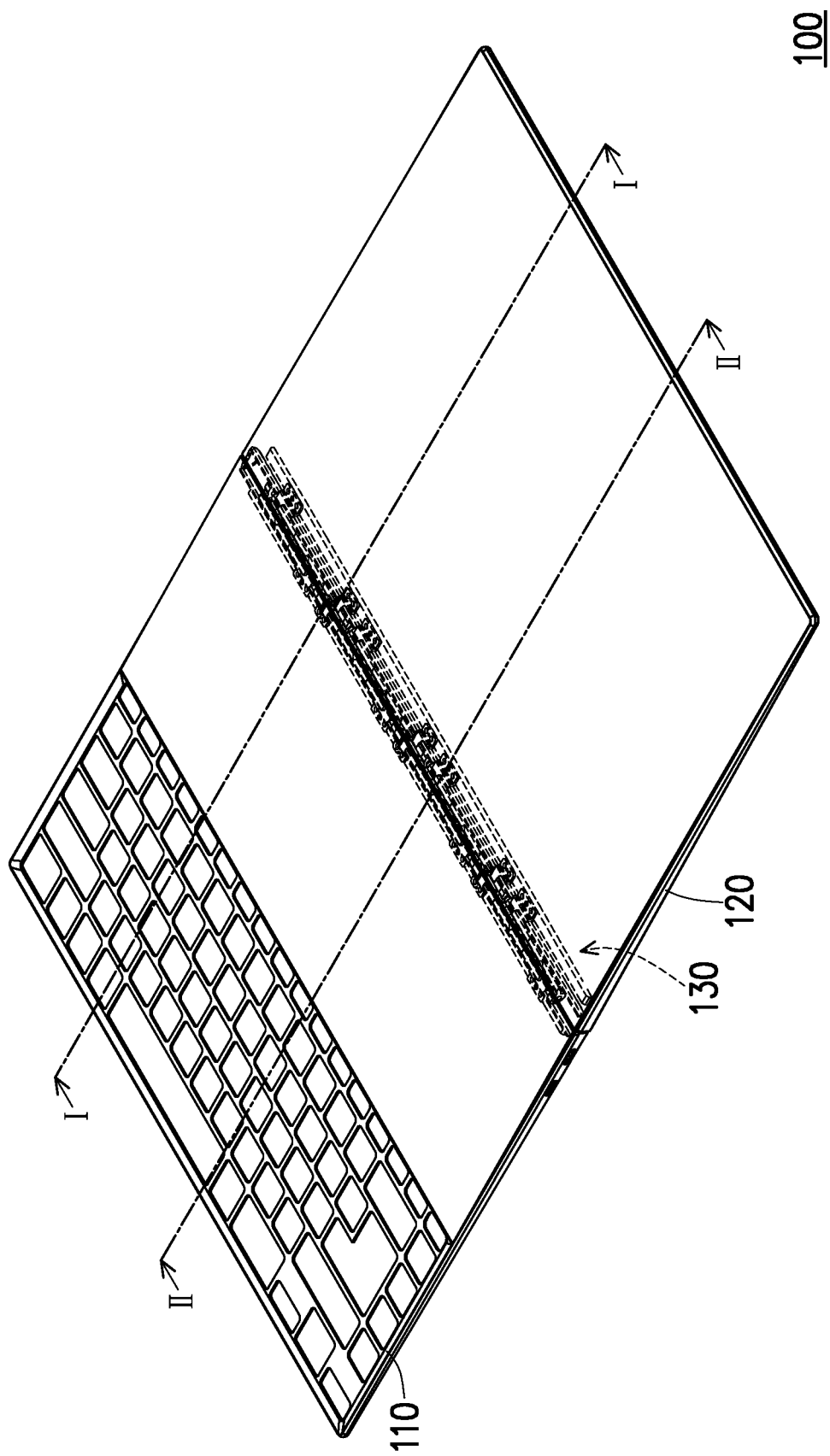
FIG. 1B is a perspective schematic view illustrating the foldable electronic device in FIG. 1A in another mode.

Referring to FIG. 1A and FIG. 1B, a foldable electronic device 100 includes a first body 110, a second body 120, a hinge mechanism 130, and a cover 140. In one embodiment, the foldable electronic device is a smart phone or a laptop computer.

For comprehensive description, the foldable electronic device 100 in FIG. 1A is in a first mode, and the foldable electronic device 100 in FIG. 1B is in a second mode. Moreover, the hinge mechanism 130 is shown in dashed lines in FIG. 1B to clearly illustrate the position relationship between the hinge mechanism 130 and other elements.

The first body 110 is pivotally connected to the second body 120 through the hinge mechanism 130. The first body 110 and the second body 120 rotate relative to each other. As shown in the figures, the first mode in FIG. 1A is a closed mode, and the second mode in FIG. 1B is an unfolded mode.

Figure 2:
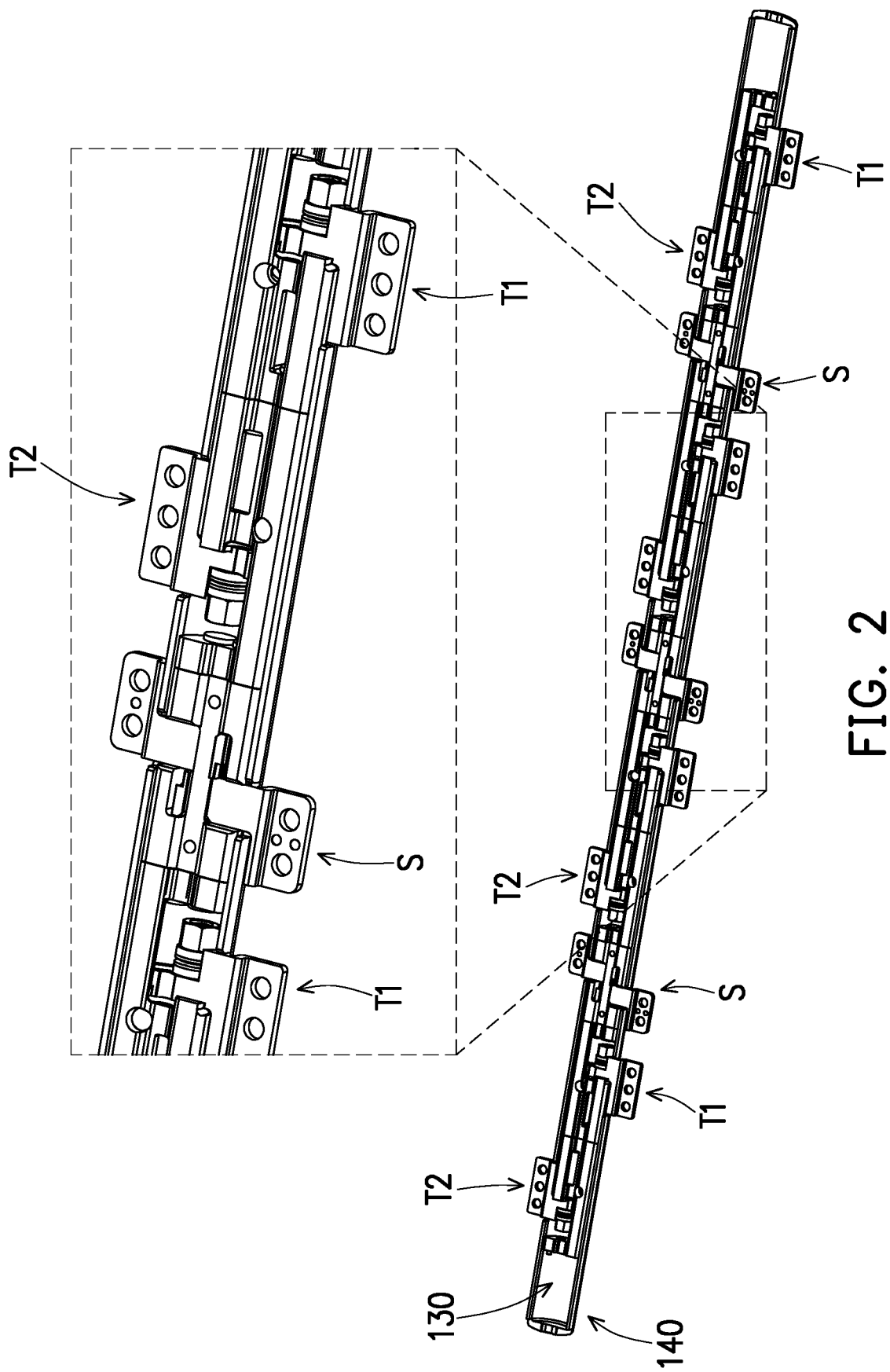
FIG. 2 is a perspective schematic view illustrating part of elements of the foldable electronic device in FIG. 1B.
Figure 3B:
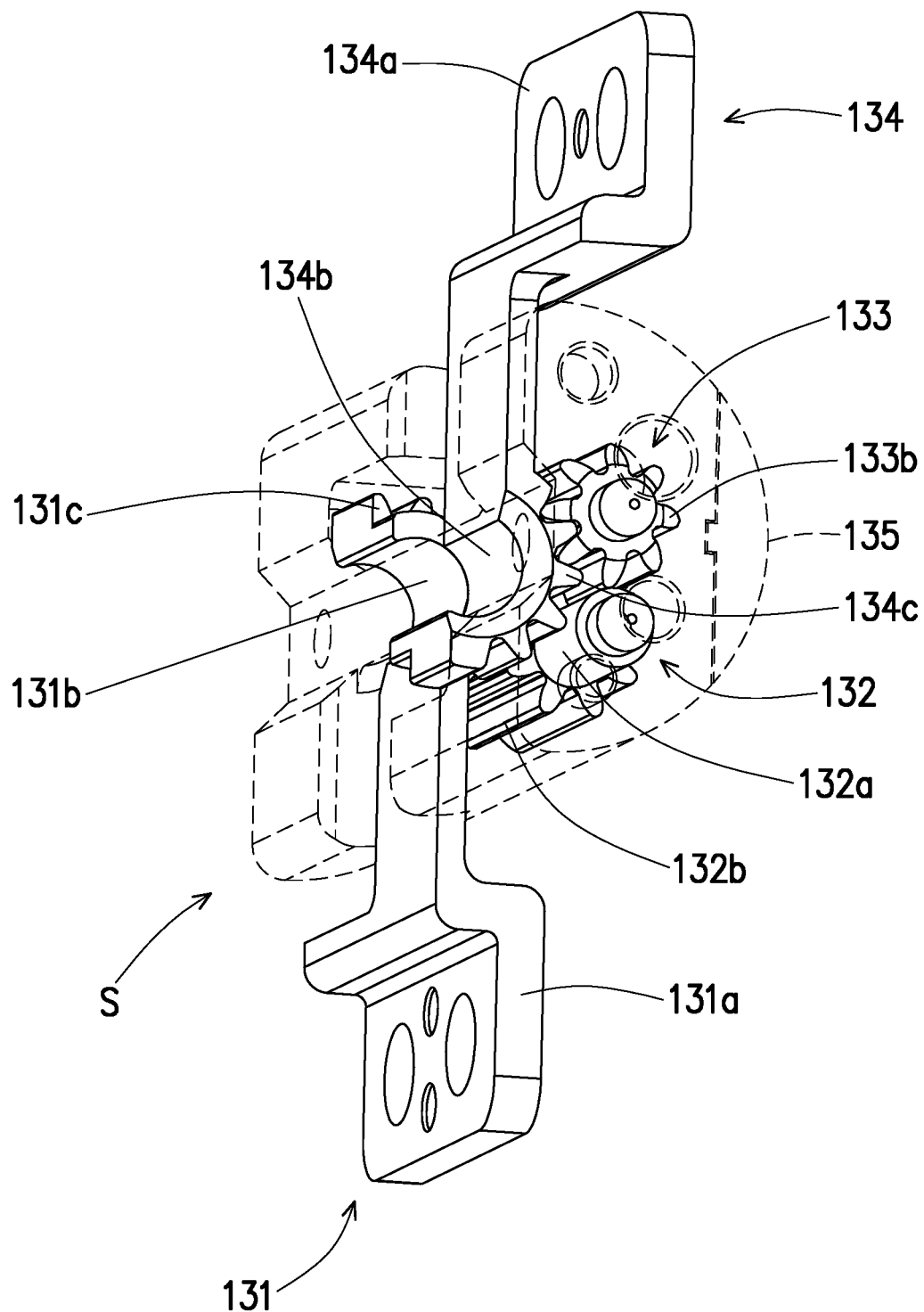
FIG. 3B is a perspective schematic view illustrating part of elements of a hinge mechanism in FIG. 1B.

Referring to FIG. 2, FIG. 3A, and FIG. 3B, the hinge mechanism 130 includes a first rack plate 131, a first gear shaft 132, a second gear shaft 133, a second rack plate 134, and a base 135. The first rack plate 131 and the second rack plate 134 are movably disposed on the base 135, and the first gear shaft 132 and the second gear shaft 133 are pivotally disposed within the base 135. Note that in FIG. 3A and FIG. 3B, the base 135 is shown in dashed lines to clearly illustrate the position relationship among the elements.

Figure 4A:
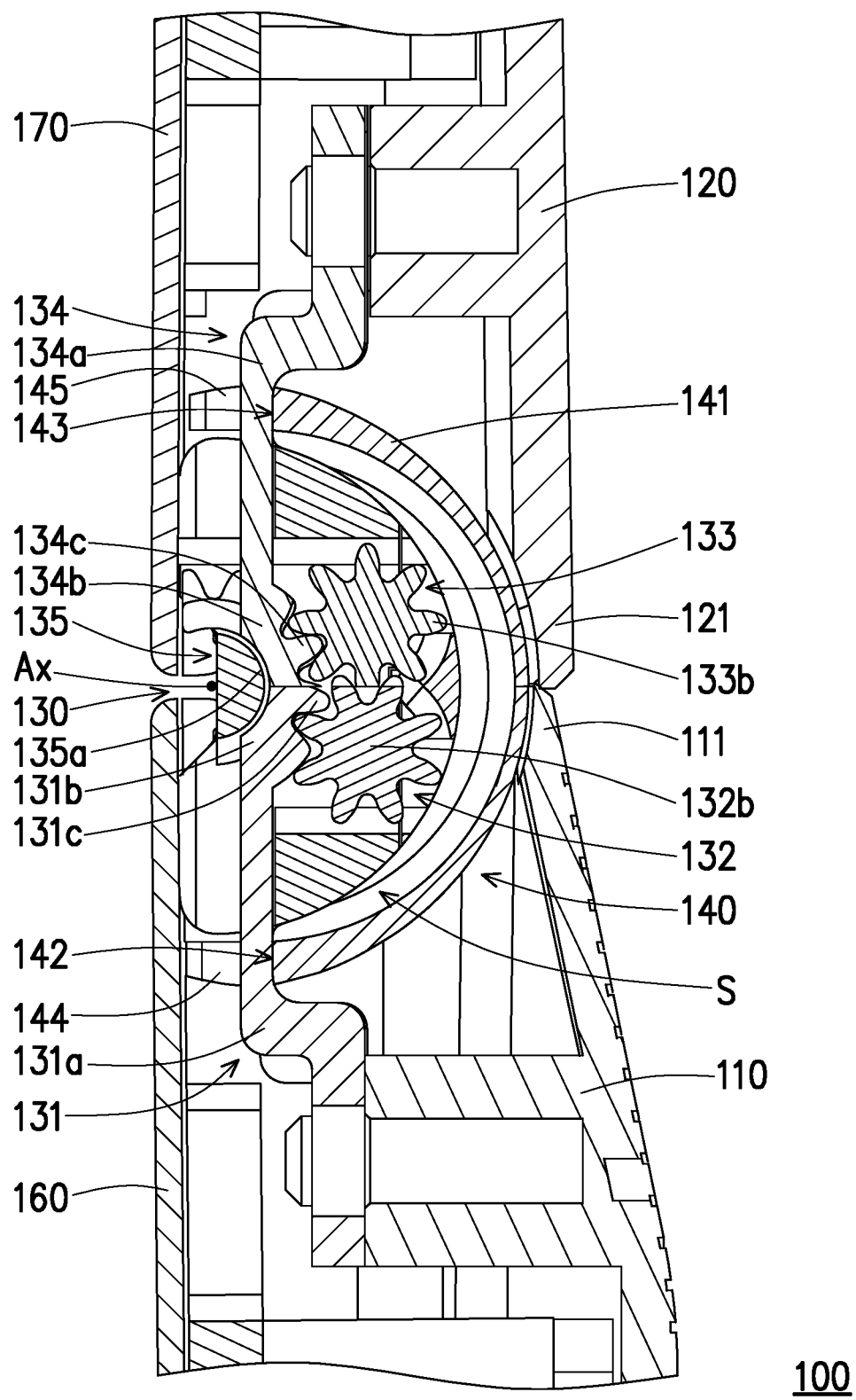
FIG. 4A is a schematic cross-sectional view illustrating part of the foldable electronic device taken along the line I-I in FIG. 1B.
Figure 4B:
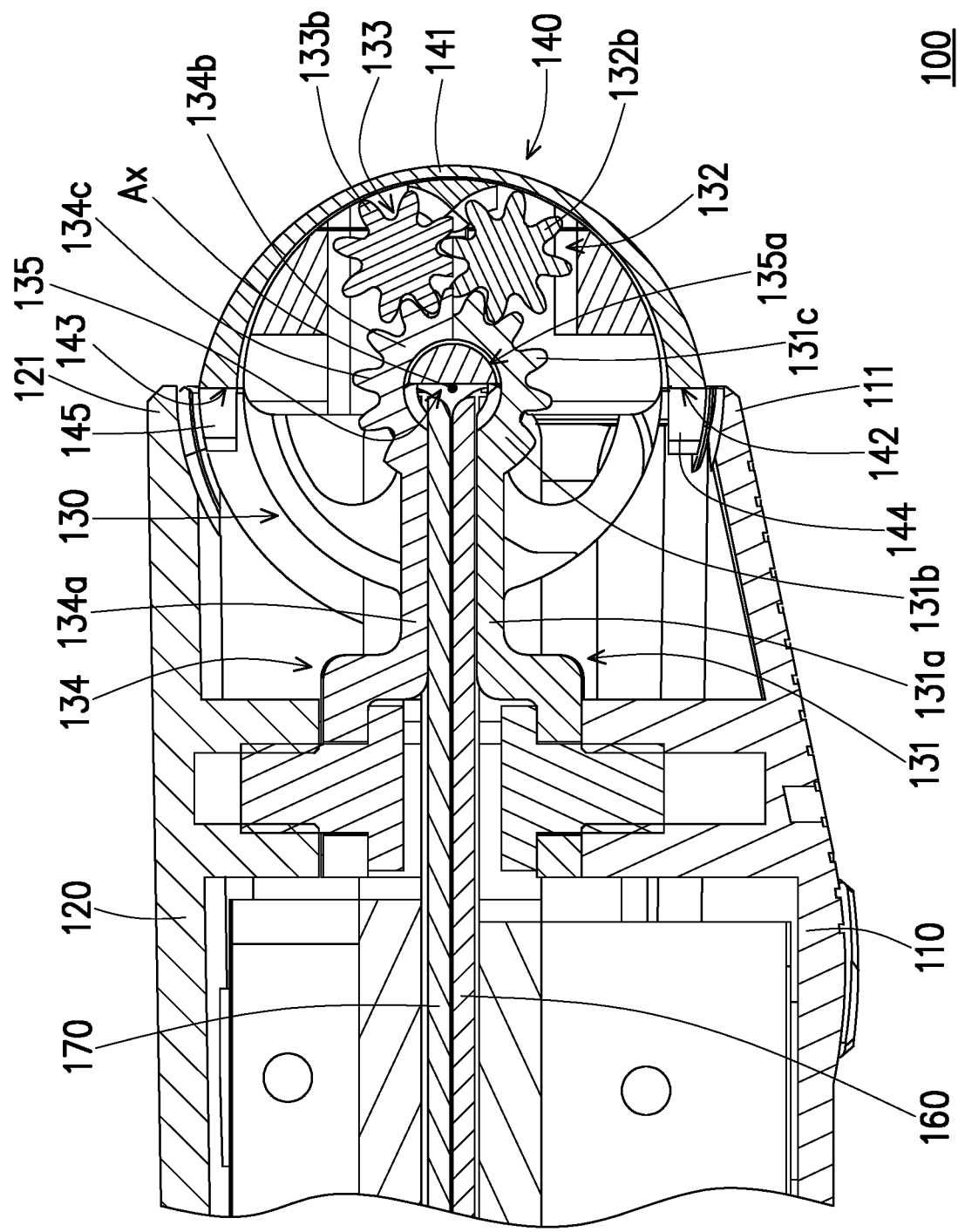
FIG. 4B is a schematic cross-sectional view illustrating part of the foldable electronic device in FIG. 4A in one mode.

Next, referring to FIG. 4A and FIG. 4B, the first rack plate 131 and the second rack plate 134 are aligned, and the first rack plate 131 and the second rack plate 134 are both rotatably disposed along an axis AX on the base 135. That is, the first rack plate 131 and the second rack plate 134 are coaxial.

The first rack plate 131 is disposed on the first body 110 so that the first body 110 rotates with the first rack plate 131 relative to the base 135. The second rack plate 134 is disposed on the second body 120 so that the second body 120 rotates with the second rack plate 134 relative to the base 135.

Figure 5A:
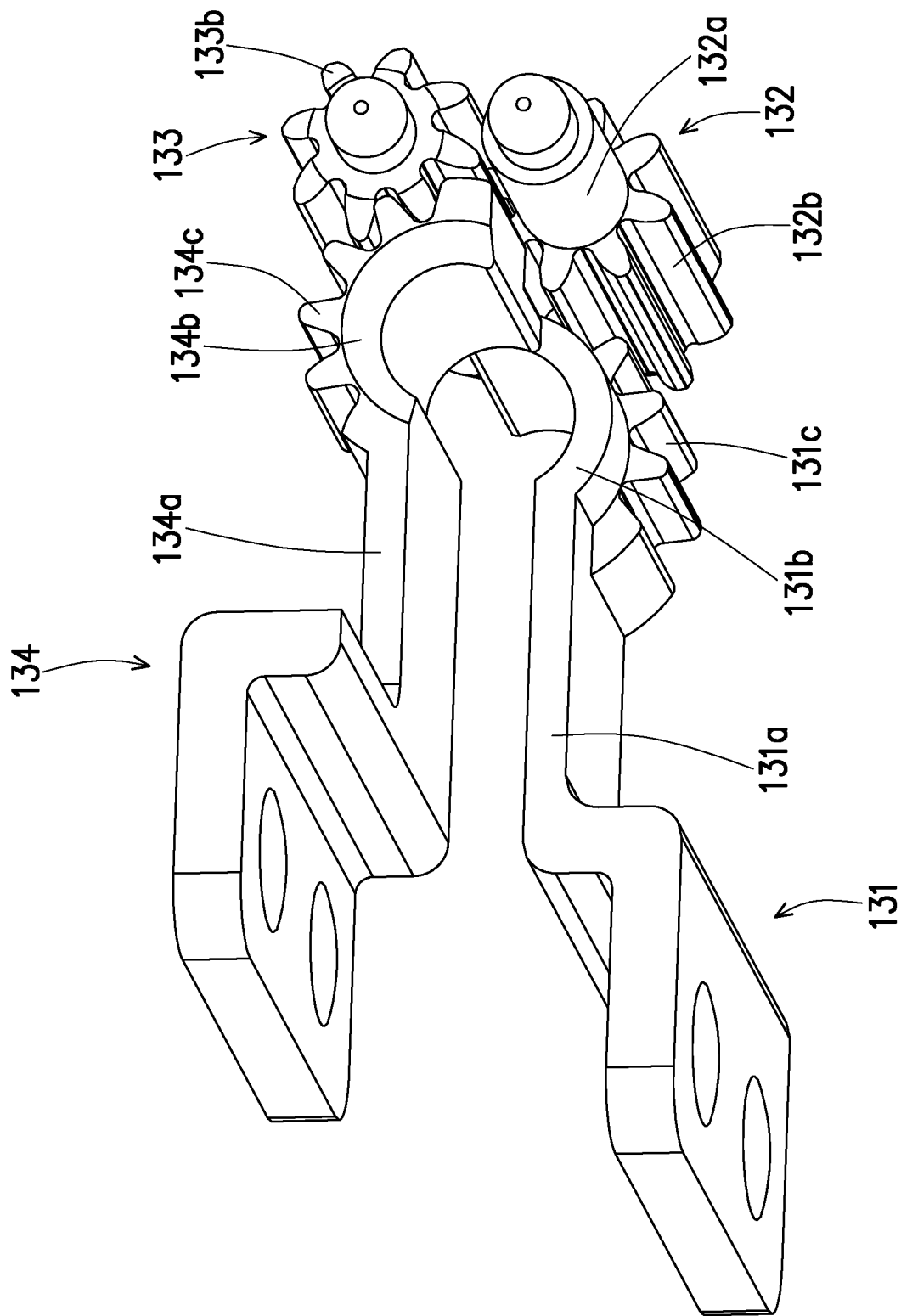
FIG. 5A is a perspective schematic view illustrating part of elements in FIG. 3A.
Figure 5B:
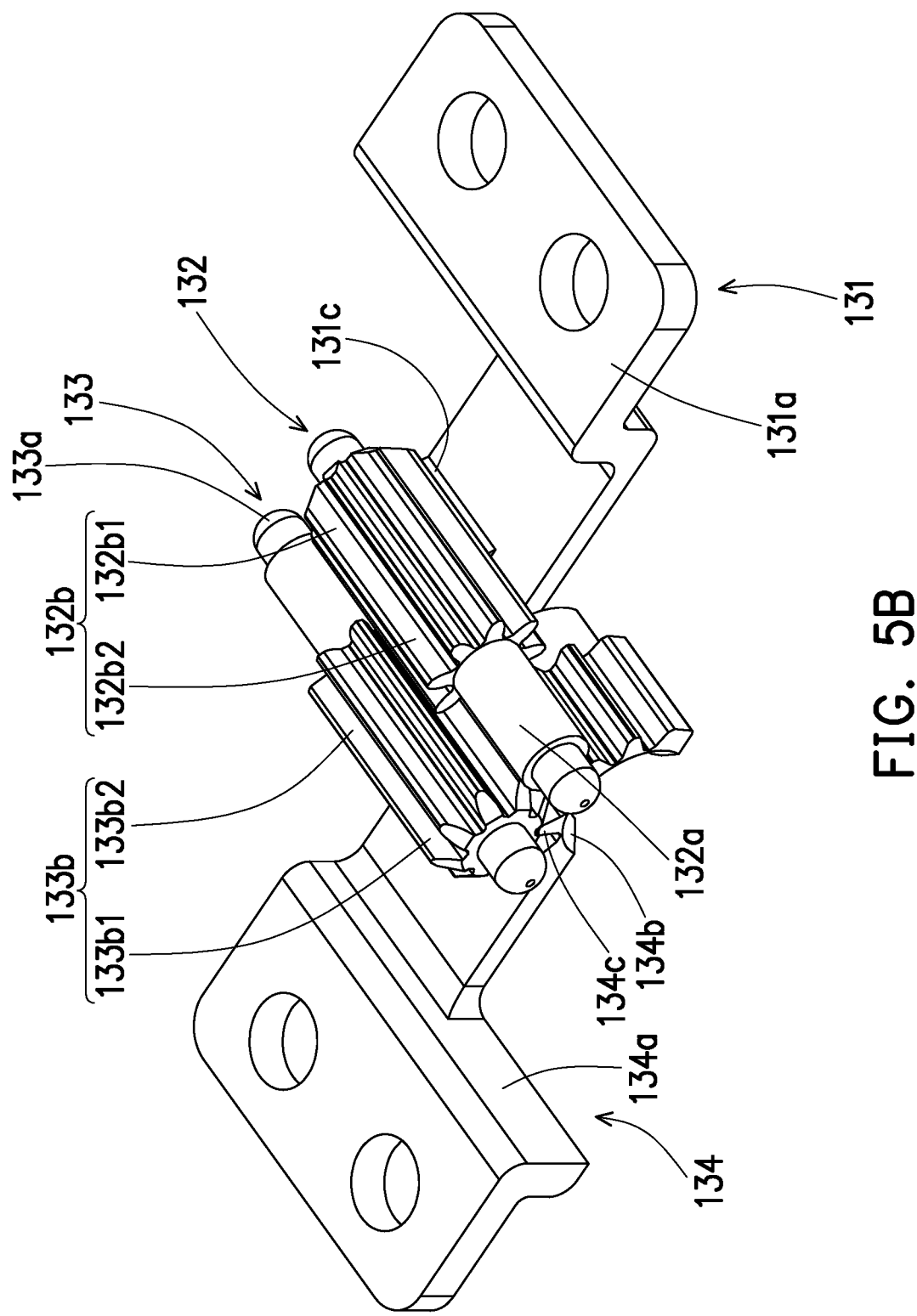
FIG. 5B is a perspective schematic view illustrating part of elements in FIG. 3B.

Referring to FIG. 1B, FIG. 5A, and FIG. 5B, the first rack plate 131, the first gear shaft 132, the second gear shaft 133, and the second rack plate 134 are meshed in sequence, so the first body 110 and the second body 120 rotate synchronically relative to each other. That is, in the hinge mechanism 130, the first rack plate 131, the first gear shaft 132, the second gear shaft 133, the second rack plate 134, and the base 135 serve as a synchronous mechanism S through which the first body 110 and the second body 120 rotate synchronically.

Referring to FIG. 4A, FIG. 4B, FIG. 5A, and FIG. 5B, the first rack plate 131 includes a first plate portion 131a, a first arc-shaped guide portion 131b connected to the first plate portion 131a, and a first rack 131c formed on the first arc-shaped guide portion 131b. The first plate portion 131a is fastened to the first body 110 with screws and connected to the first body 110.

The second rack plate 134 includes a second plate portion 134a, a second arc-shaped guide portion 134b connected to the second plate portion 134a, and a second rack 134c formed on the second arc-shaped guide portion 134b. The second plate portion 134a is fastened to the second body 120 with screws and connected to the second body 120.

The base 135 has an arc-shaped guide groove 135a, and both the first arc-shaped guide portion 131b and the second arc-shaped guide portion 134b extend into the arc-shaped guide groove 135a and are movably disposed on the base 135.

Taking the transition from the first mode shown in FIG. 4B to the second mode shown in FIG. 4A as an example, in the transition, the first arc-shaped guide portion 131b rotates counterclockwise relative to the base 135, while the second arc-shaped guide portion 134b rotates clockwise relative to the base 135. That is, the rotation directions of the first rack plate 131 and the second rack plate 134 are opposite.

The first gear shaft 132 includes a first shaft portion 132a and a first gear 132b connected to the first shaft portion 132a. The second gear shaft 133 includes a second shaft portion 133a and a second gear 133b connected to the second shaft portion 133a. To easily recognize the distinction, the first gear 132b is divided into a first portion 132b1 and a second portion 132b2, and the second gear 133b is divided into a third portion 133b1 and a fourth portion 133b2.

The first portion 132b1 of the first gear 132b is meshed with the first rack 131c of the first rack plate 131 and is aligned with the second shaft portion 133a of the second gear shaft 133. The third portion 133b1 of the second gear 133b is meshed with the second rack 134c of the second rack plate 134 and is aligned with the first shaft portion 132a of the first gear shaft 132. The second portion 132b2 of the first gear 132b and the fourth portion 133b2 of the second gear 133b are meshed with each other.

In other words, the first portion 132b1 of the first gear 132b and the third portion 133b1 of the second gear 133b are misaligned with each other and misaligned with the second rack 134c of the second rack plate 134, and the third portion 133b1 of the second gear 133b and the first rack 131c of the first rack plate 131 are misaligned with each other. Accordingly, the thickness of the first body 110 and the thickness of the second body 120 is reduced, which contributes to the reduction of the thickness of the foldable electronic device 100.

Referring to FIG. 4A, FIG. 4B, FIG. 6A, and FIG. 6B, the foldable electronic device 100 further includes an elastic element 150. The cover 140 covers the hinge mechanism 130 and is movably disposed on the hinge mechanism 130, so the entire cover 140 is relatively close to the hinge mechanism 130 to abut against and support the first body 110 and the second body 120 or relatively far away from the hinge mechanism 130 and separated from the first body 110 and the second body 120.

The elastic element 150 is disposed between the hinge mechanism 130 and the cover 140, and two ends of the elastic element 150 are connected to the hinge mechanism 130 and the cover 140 respectively.

For example, the base 135 has a sliding groove 135b, and the cover 140 has a sliding shaft 147 slidably disposed in the sliding groove 135b. For example, the sliding groove 135b is a circular hole, and the sliding shaft 147 is a circular shaft, but the disclosure is not limited thereto. The elastic element 150 is sleeved on the sliding shaft 147 and disposed in the sliding groove 135b, and a compression spring is adopted to constantly drive the cover 140 to move close to the hinge mechanism 130.

Specifically, the first body 110 has a first connecting portion 111, and the second body 120 has a second connecting portion 121. The cover 140 includes a main body 141, a first abutting portion 142 recessed in the main body 141 and corresponding to the first plate portion 131a, a second abutting portion 143 recessed in the main body 141 and corresponding to the second plate portion 134a, a first supporting portion 144 protruding from the main body 141 and corresponding to the first connecting portion 111, and a second supporting portion 145 protruding from the main body 141 and corresponding to the second connecting portion 121.

In the first mode shown in FIG. 4B, the second body 120 is closed relative to the first body 110. The first plate portion 131a of the first rack plate 131 is separated from the first abutting portion 142 of the cover 140 without applying force to the cover 140. The second plate portion 134a of the second rack plate 134 is separated from the second abutting portion 143 of the cover 140 without applying force to the cover 140.

Therefore, the cover 140 is relatively close to the hinge mechanism 130 and can effectively shield the hinge mechanism 130 to achieve the purpose of aesthetic appearance. The first supporting portion 144 of the cover 140 abuts against the first connecting portion 111 and supports the first body 110 to increase the strength of the first body 110, and the second supporting portion 145 of the cover 140 abuts against the second connecting portion 121 and can support the second body 120 to increase the strength of the second body 120.

In the second mode shown in FIG. 4A, the second body 120 rotates relative to the first body 110, and the first plate portion 131a of the first rack plate 131 is connected to the first abutting portion 142 of the cover 140 to restrict the relative positions of the cover 140 and the hinge mechanism 130. Moreover, the second plate portion 134a of the second rack plate 134 is connected to the second abutting portion 143 of the cover 140 to restrict the relative positions of the cover 140 and the hinge mechanism 130.

Therefore, the cover 140 is relatively far away from the hinge mechanism 130 and can also effectively shield the hinge mechanism 130 to achieve the purpose of aesthetic appearance. The first supporting portion 144 of the cover 140 is separated from the first connecting portion 111 of the first body 110, and the second supporting portion 145 of the cover 140 is separated from the second connecting portion 121 of the second body 120.

In the transition from the first mode shown in FIG. 4B to the second mode shown in FIG. 4A, the first rack plate 131 pushes the cover 140 through the cooperation of the first plate portion 131a and the first abutting portion 142, and the second rack plate 134 pushes the cover 140 through the cooperation of the second plate portion 134a and the second abutting portion 143. Therefore, the cover 140 moves away from the first gear shaft 132 and the second gear shaft 133, the first supporting portion 144 of the cover 140 is separated from the first connecting portion 111 of the first body 110, and the second supporting portion 145 of the cover 140 is separated from the second connecting portion 121 of the second body 120.

Figure 6A:
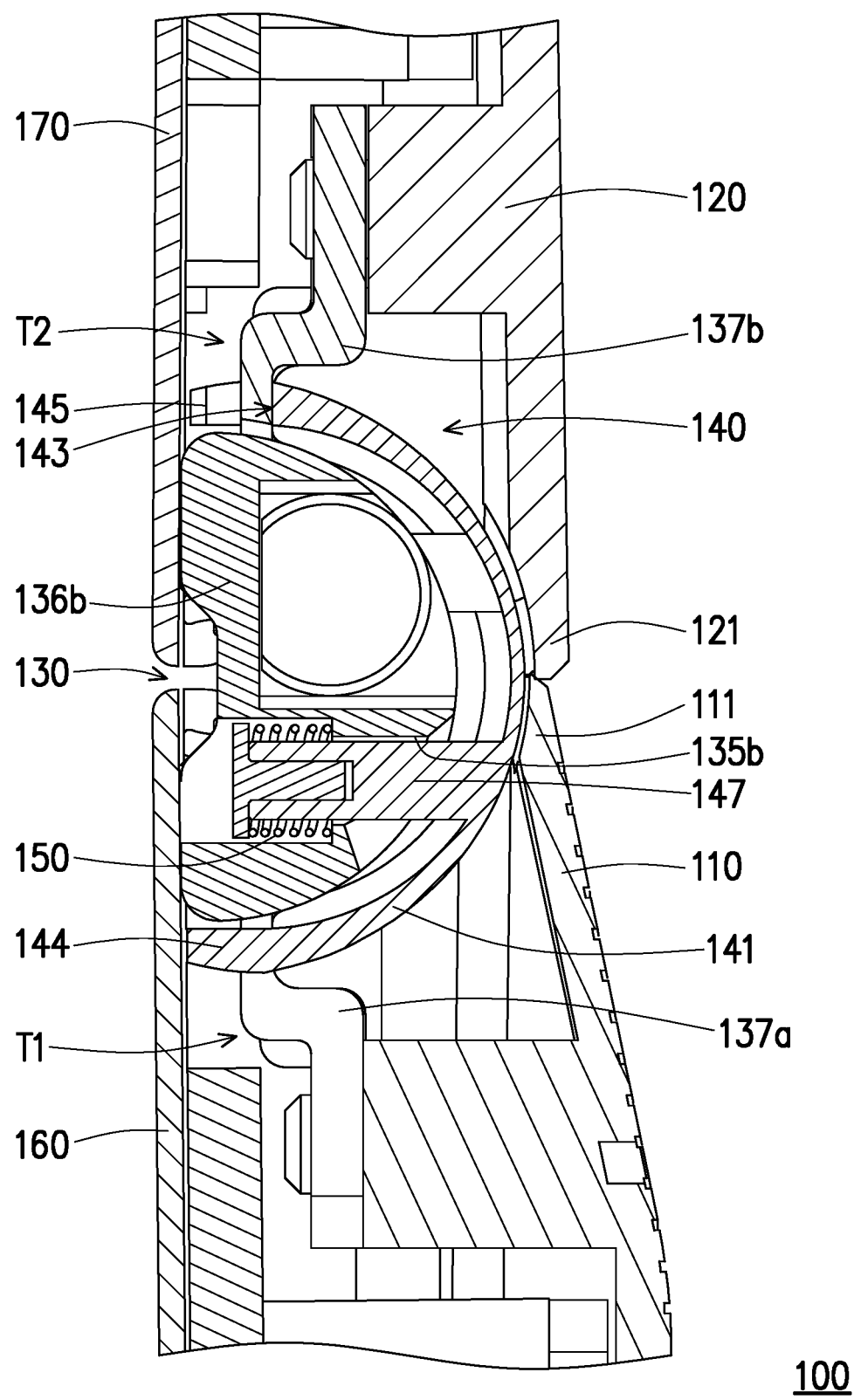
FIG. 6A is a schematic cross-sectional view illustrating part of the foldable electronic device taken along the line II-II in FIG. 1B.
Figure 6B:
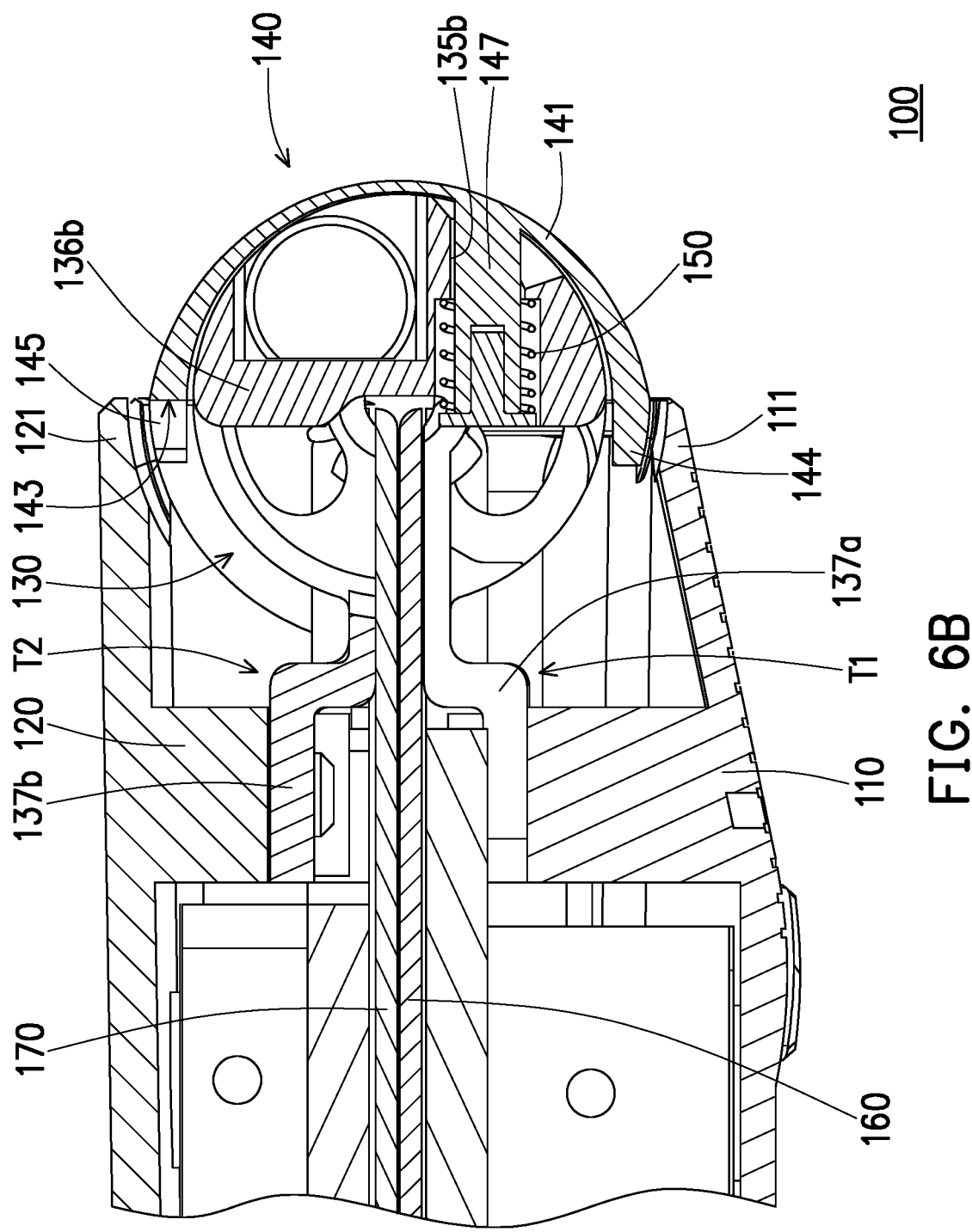
FIG. 6B is a schematic cross-sectional view illustrating part of the foldable electronic device in FIG. 6A in one mode.

Next, referring to FIG. 6A, at the phase, the elastic element 150 is compressed to accumulate elastic force. Meanwhile, when the foldable electronic device 100 transits from the second mode to the first mode, the elastic element 150 can release the accumulated elastic force as shown in FIG. 6B, and the cover 140 is moved close to the hinge mechanism 130.

Figure 7:
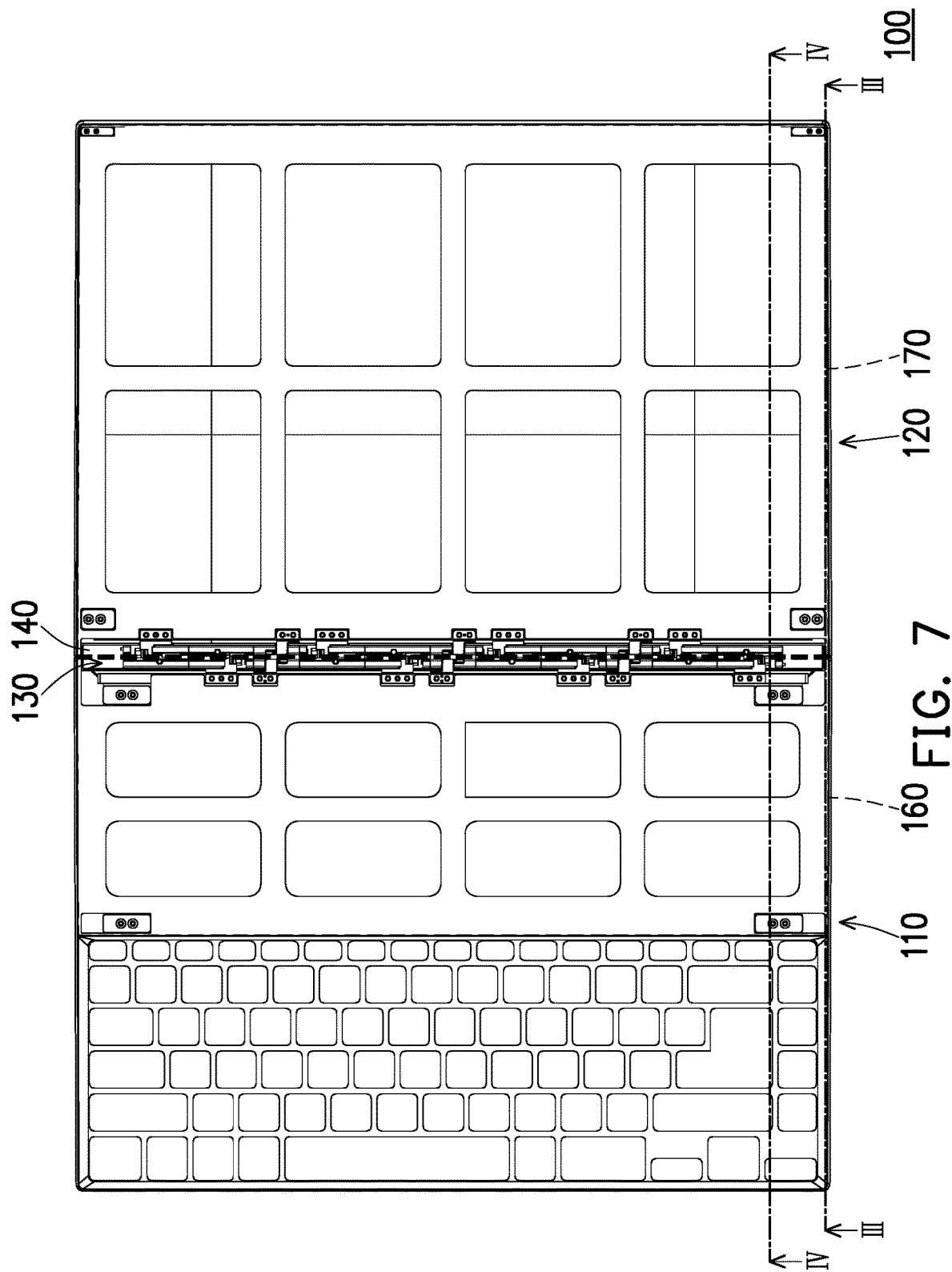
FIG. 7 is a schematic top view of the foldable electronic device in FIG. 1B.
Figure 8A:
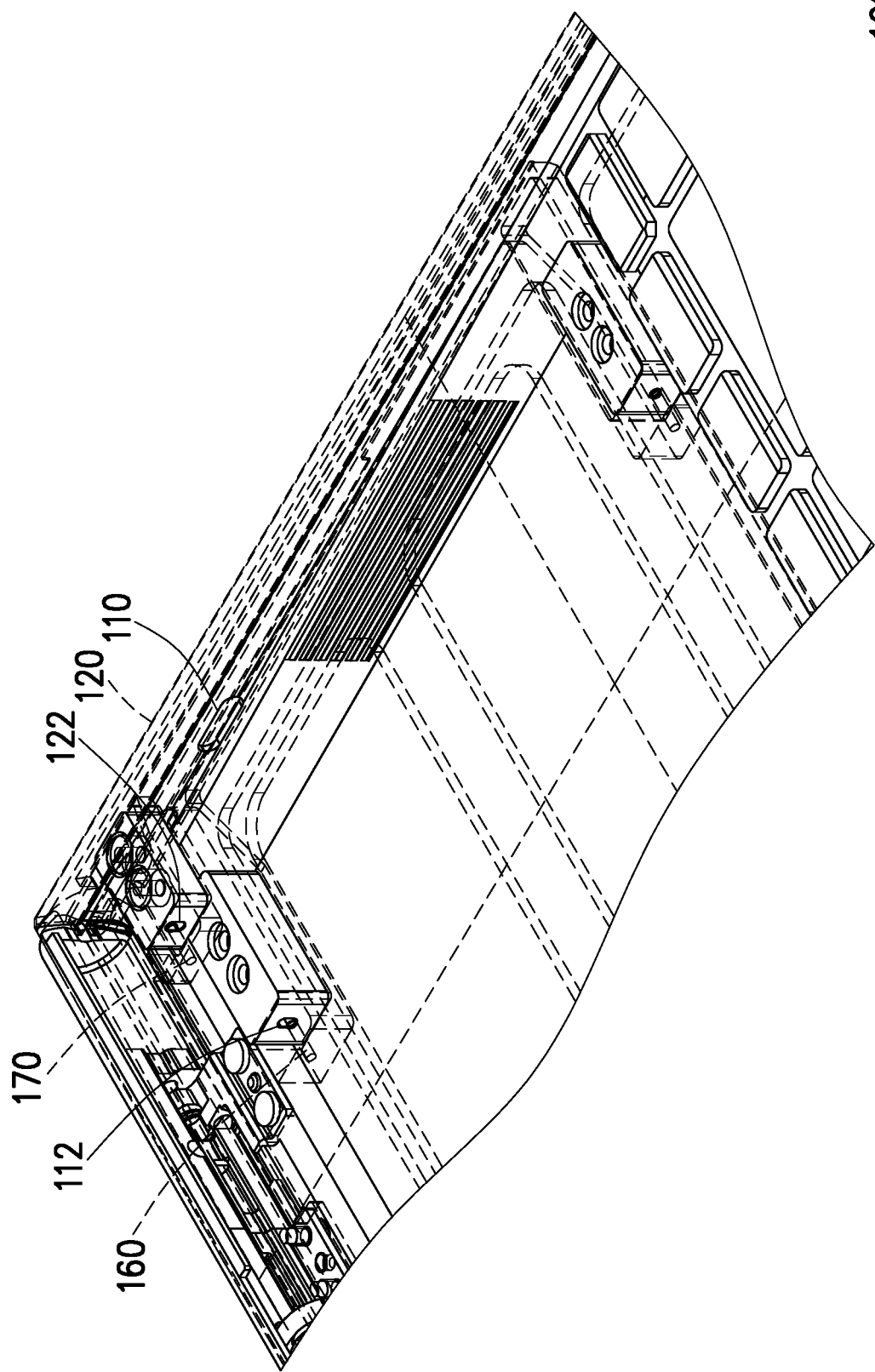
FIG. 8A is an enlarged schematic view illustrating part of the foldable electronic device in FIG. 1A.
Figure 8B:
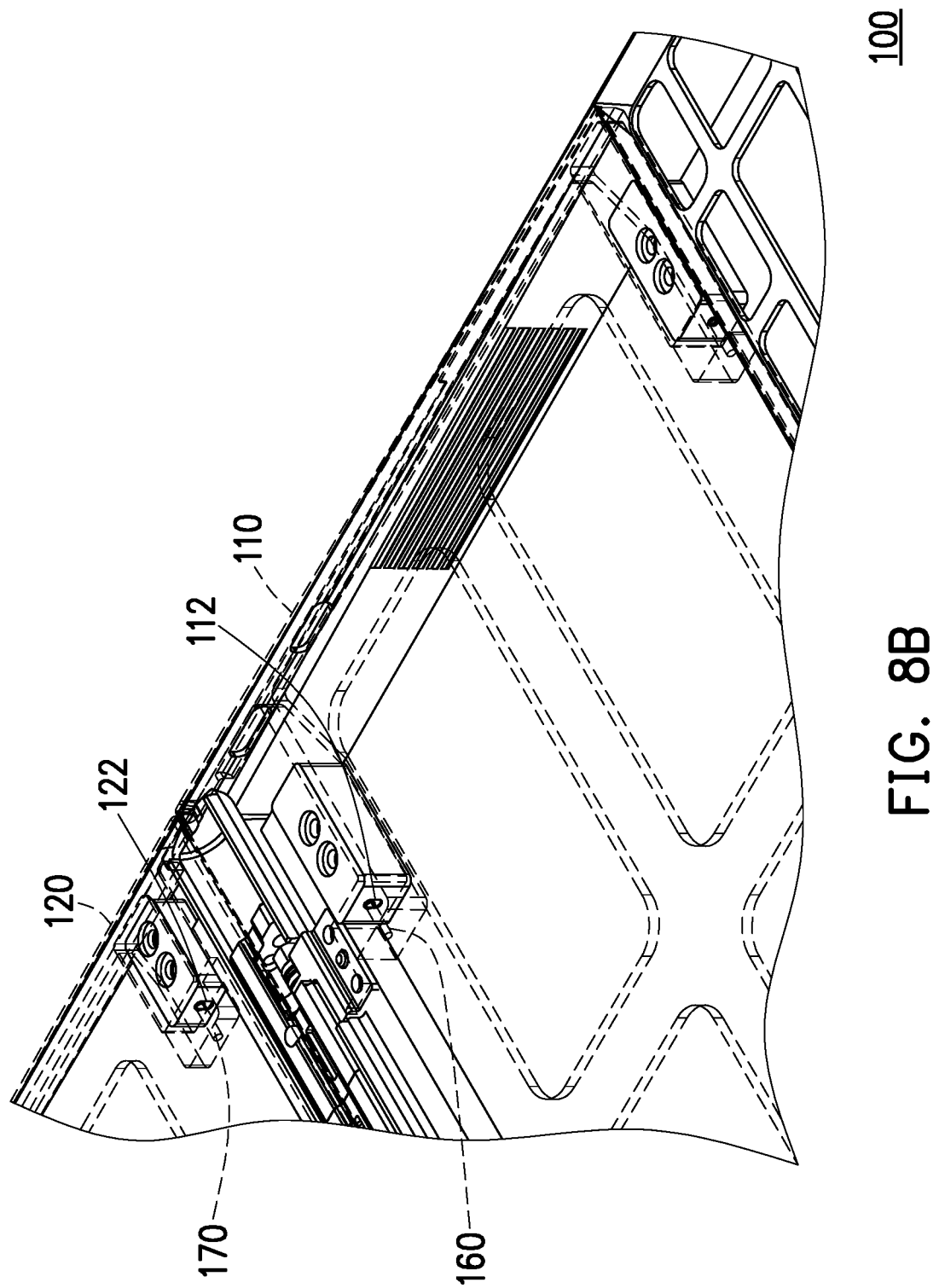
FIG. 8B is an enlarged schematic view illustrating part of the foldable electronic device in FIG. 1B.

Referring to FIG. 7, FIG. 8A, and FIG. 8B, the foldable electronic device 100 further includes a first screen 160 and a second screen 170. A side of the first screen 160 away from the cover 140 is pivotally connected to the first body 110. A side of the first screen 160 close to the cover 140 serves as a movable end and is lifted or lowered relative to the first body 110. A side of the second screen 170 away from the cover 140 is pivotally connected to the second body 120. A side of the second screen 170 close to the cover 140 serves as a movable end and is lifted or lowered relative to the second body 120.

Figure 9A:
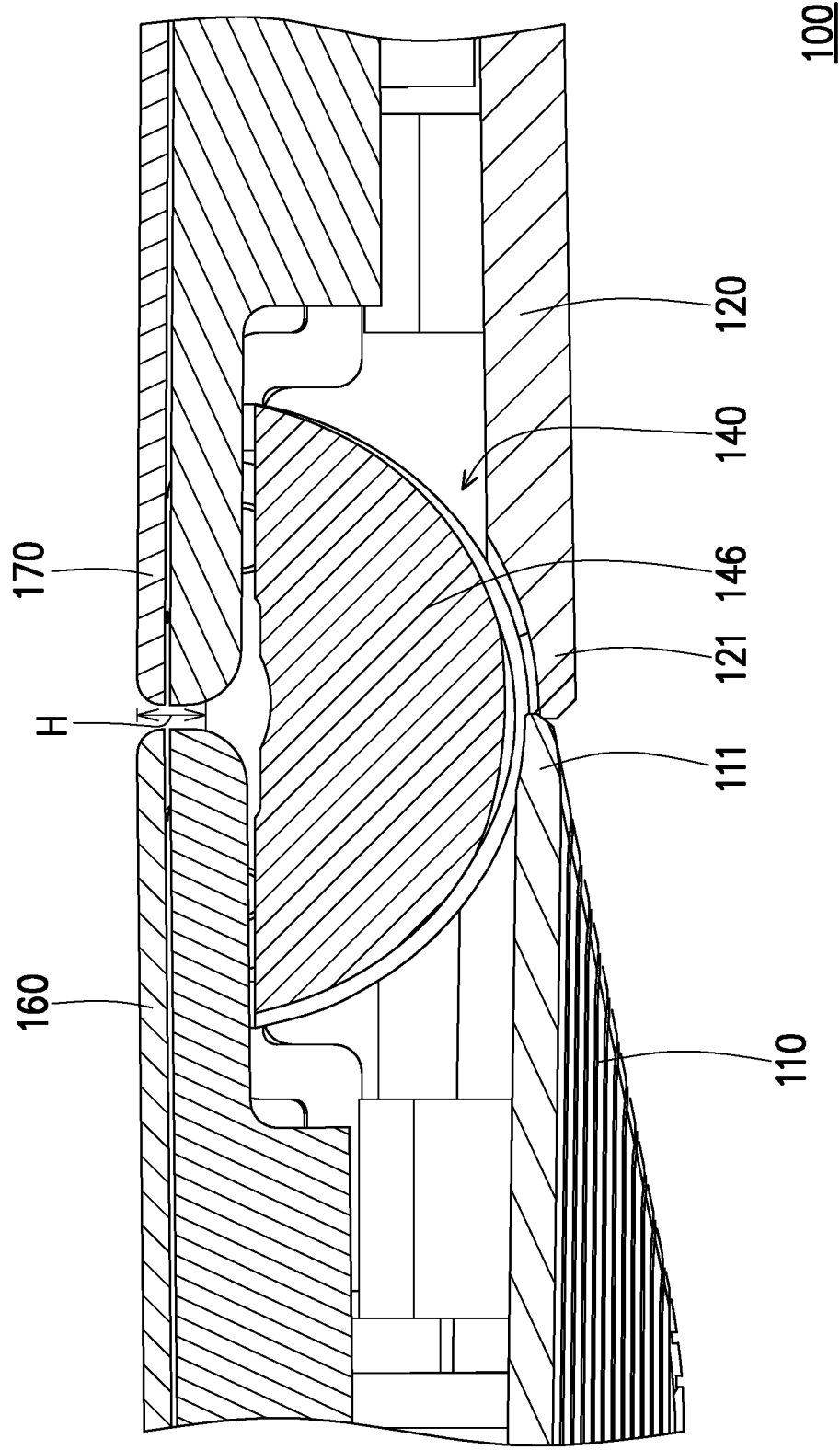
FIG. 9A is a schematic cross-sectional view illustrating the foldable electronic device taken along the line III-III in FIG. 7.
Figure 9B:
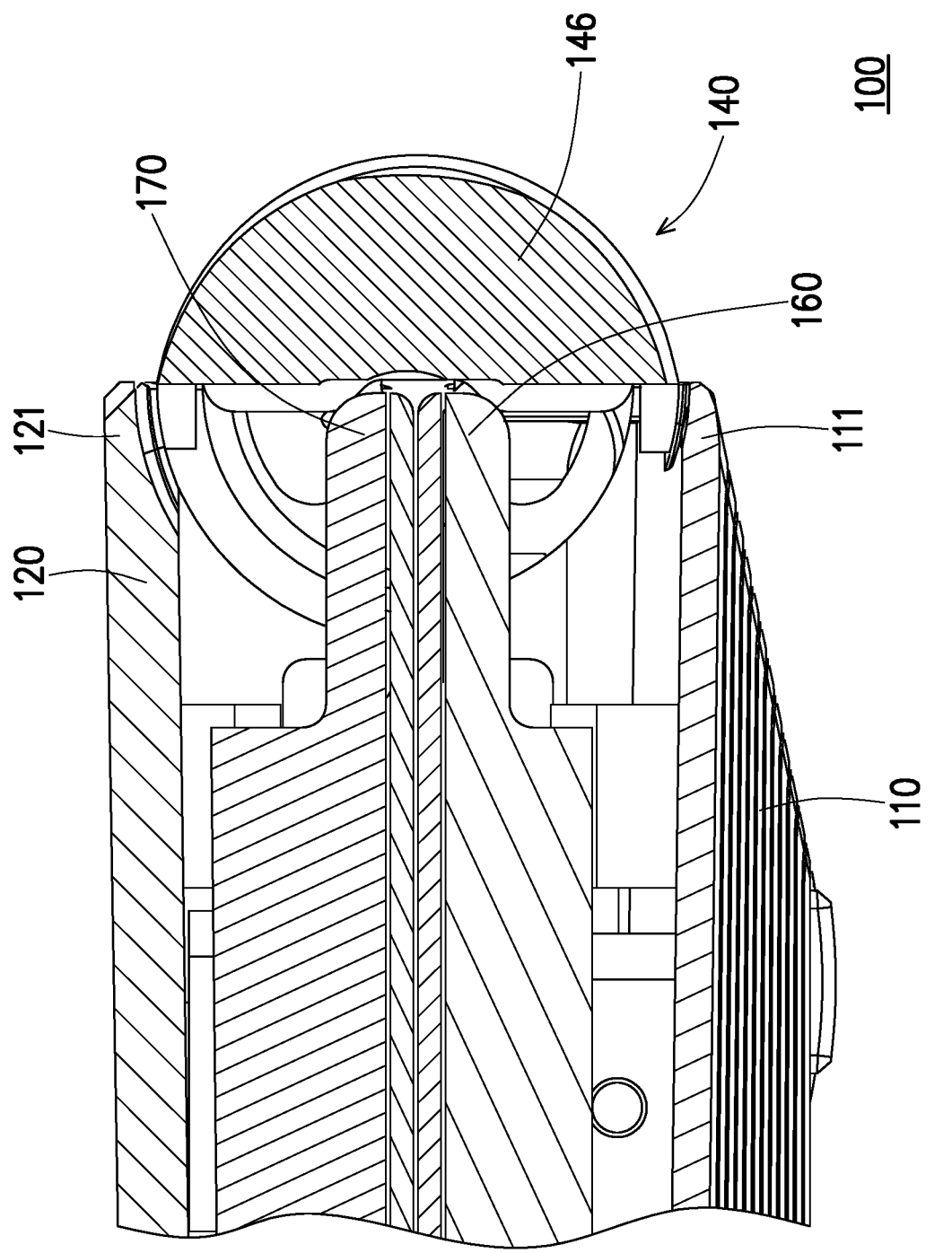
FIG. 9B is a schematic cross-sectional view illustrating part of the foldable electronic device in FIG. 9A in one mode.
Figure 10A:
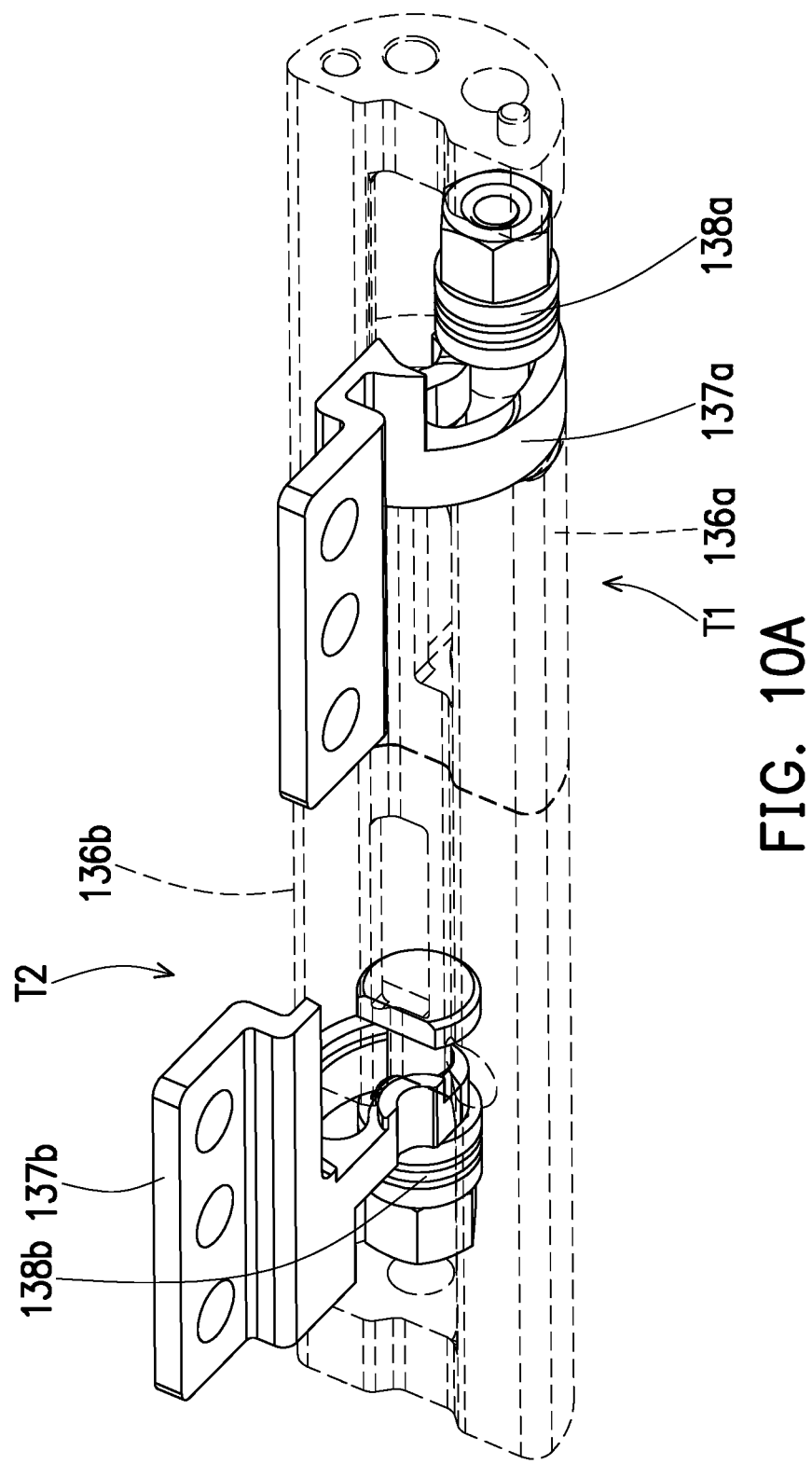
FIG. 10A is a perspective schematic view illustrating part of the elements of the hinge mechanism in FIG. 1A.
Figure 10B:
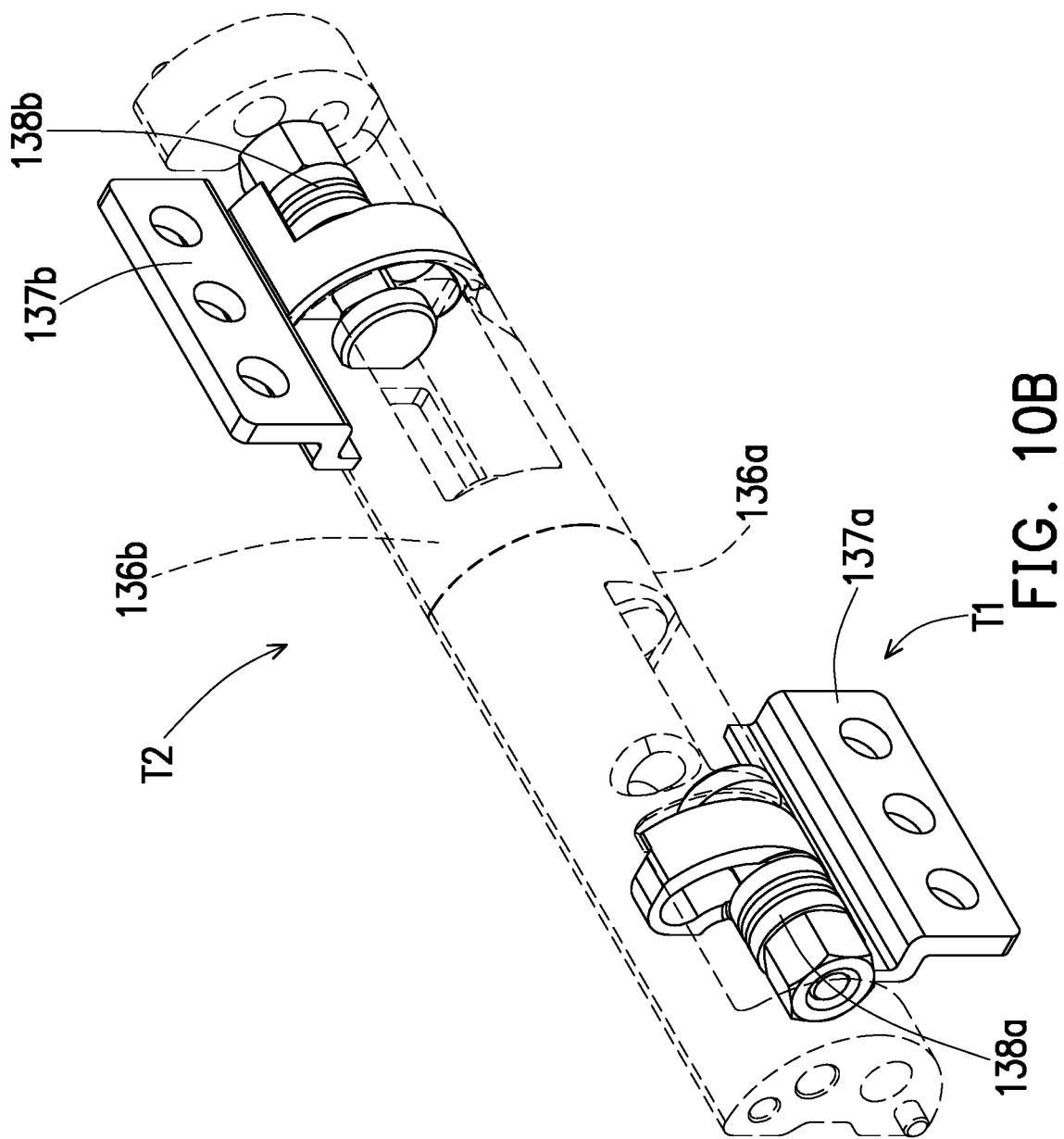
FIG. 10B is a perspective schematic view illustrating part of the elements of the hinge mechanism in FIG. 1B.
Figure 11A:
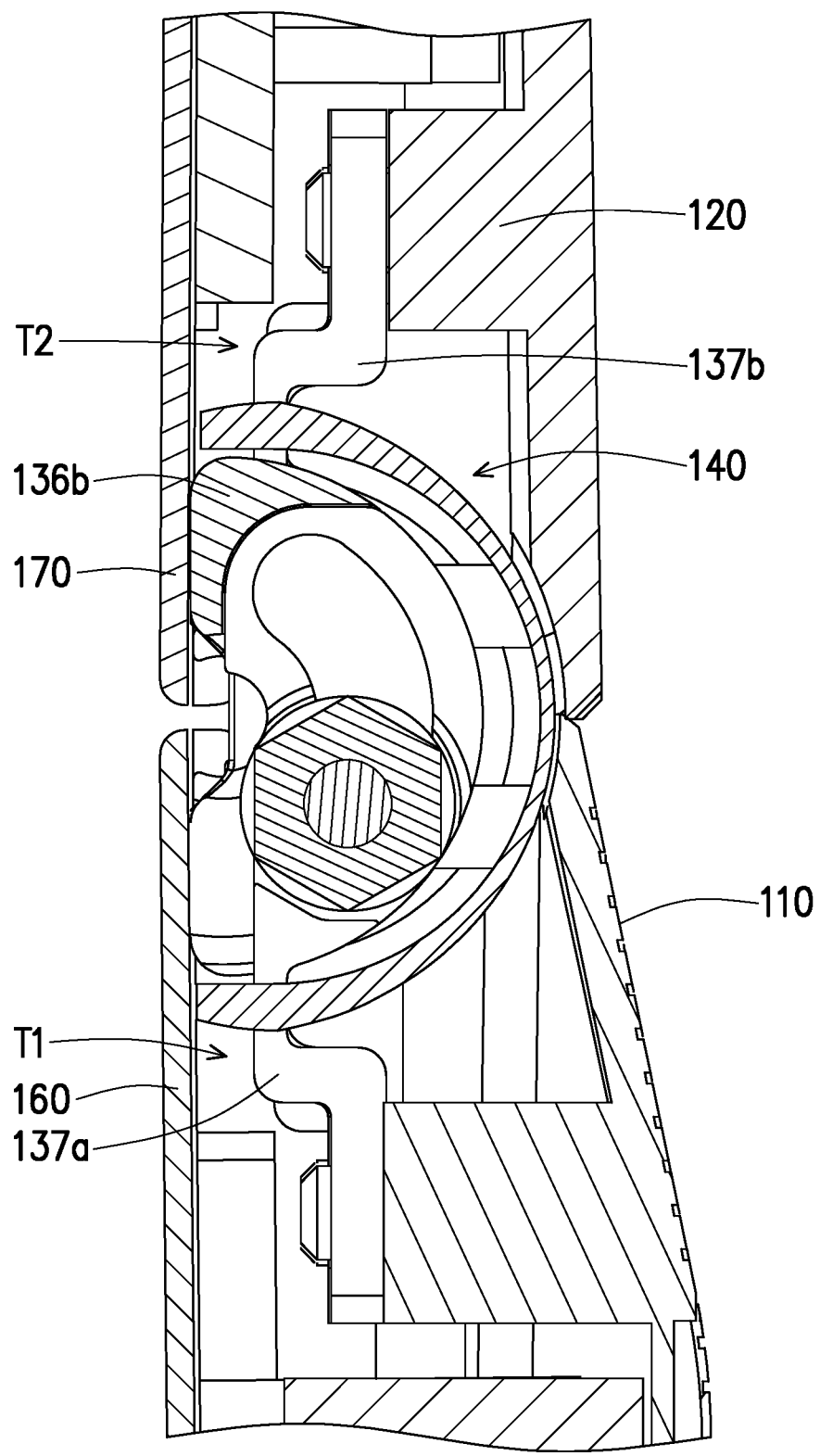
FIG. 11A is a schematic cross-sectional view illustrating the foldable electronic device taken along the line IV-IV in FIG. 7.
Figure 11B:
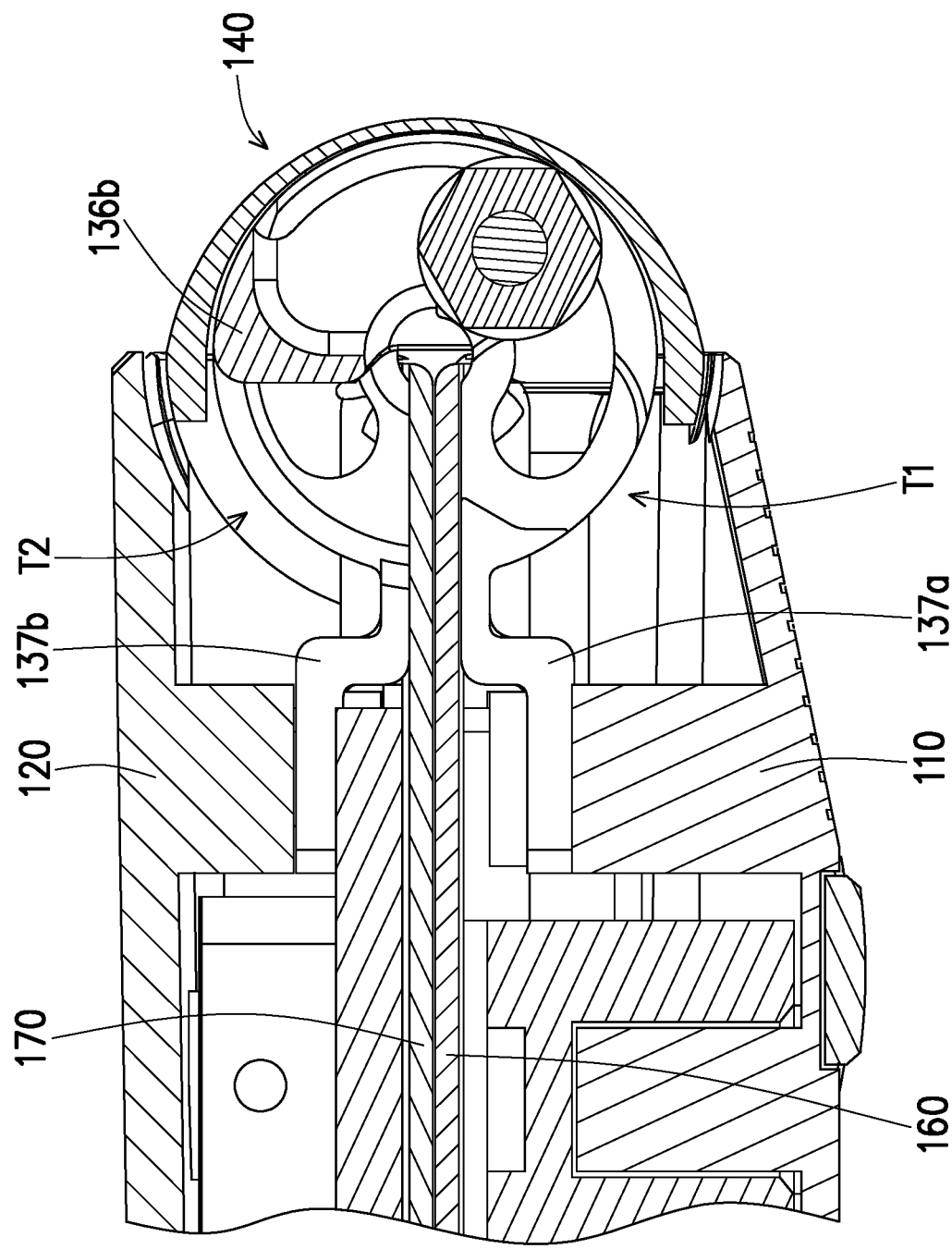
FIG. 11B is a schematic cross-sectional view illustrating part of the foldable electronic device in FIG. 11A in one mode.

Next, referring to FIG. 9A and FIG. 9B, the cover 140 further includes a pushing portion 146 corresponding to the first screen 160 and the second screen 170. The pushing portion 146 is connected to the end of the main body 141. The first body 110 has a first restricting portion 112, and part of the first screen 160 extends into the first restricting portion 112. The second body 120 has a second restricting portion 122, and part of the second screen 170 extends into the second restricting portion 122. The first restricting portion 112 and the second restricting portion 122 are long-groove-shaped.

In the first mode shown in FIG. 8A and FIG. 9B, the pushing portion 146 of the cover 140 is separated from the first screen 160 and the second screen 170.

In the second mode shown in FIG. 8B and FIG. 9A, the pushing portion 146 of the cover 140 is connected to the first screen 160 and the second screen 170 and supports the first screen 160 and the second screen 170. Moreover, the cover 140 has moved away from the hinge mechanism 130, so a space is allowed for the first screen 160 and the second screen 170 to prevent damages to the first screen 160 and the second screen 170 caused by the structural interference between the cover 140 and the first screen 160 and the structural interference between the cover 140 and the second screen 170, respectively.

In the transition from the first mode shown in FIG. 8A and FIG. 9B to the second mode shown in FIG. 8B and FIG. 9A, the cover 140 pushes the first screen 160 to rotate through the pushing portion 146 and to be lifted relative to the first body 110. The lifting limit of the first screen 160 is restricted by the first restricting portion 112. Moreover, the cover 140 pushes the second screen 170 to rotate through the pushing portion 146 and to be lifted relative to the second body 120. The lifting limit of the second screen 170 is restricted by the second restricting portion 122.

Accordingly, by lifting the first screen 160 and the second screen 170, a specific space is available for accommodating the internal structure. That is, the first screen 160 and the second screen 170 are lifted by a height H, and the total thickness of the first body 110 and the second body 120 is reduced by the height H, which contributes to the reduction of the overall thickness of the foldable electronic device 100.

Referring to FIG. 10A, FIG. 10B, FIG. 11A, and FIG. 11B, the hinge mechanism 130 further includes a first base 136a, a first bracket 137a, a first torsion element 138a, a second base 136b, a second bracket 137b, and a second torsion element 138b. Note that the first base 136a and the second base 136b are shown in dashed lines in FIG. 10A and FIG. 10B to clearly illustrate the position relationship among the elements.

The first bracket 137a is pivotally connected to the first base 136a and connected to the first body 110, so the first body 110 can rotate relative to the first base 136a. The first torsion element 138a is disposed on the first base 136a and connected to the first bracket 137a. The first torsion element 138a is used to provide torsion force when the first body 110 rotates. That is, the first base 136a, the first bracket 137a, and the first torsion element 138a serve as a first torsion mechanism T1 for generating the torsion force on the first body 110.

The second bracket 137b is pivotally connected to the second base 136b and connected to the second body 120, so the second body 120 can rotate relative to the second base 136b. The second torsion element 138b is disposed on the second base 136b and connected to the second bracket 137b. The second torsion element 138b is used to provide torsion force when the second body 120 rotates. That is, the second base 136b, the second bracket 137b, and the second torsion element 138b serve as a second torsion mechanism T2 for generating the torsion force on the second body 120.

Referring to FIG. 2, according to requirements, multiple sets of the synchronous mechanism S, the first torsion mechanism T1, and the second torsion mechanism T2 is assembled in series. In an embodiment, alternatively only one single set of the synchronous mechanism, the first torsion mechanism, and the second torsion mechanism is disposed in the foldable electronic device.

Through the structural spatial changes when the first body and the second body rotate and when the cover is pushed away from the hinge mechanism, it has the advantage of space utilization for reducing the overall thickness of the foldable electronic device. Moreover, the cover of the disclosure covers the hinge mechanism, which not only increases the aesthetics of the foldable electronic device but also provides support for the first body and the second body when the cover abuts against the first body and the second body, thereby improving the strength of the foldable electronic device.

What is claimed is:

1. A foldable electronic device, comprising:
   a first body;
   a second body;
   a hinge mechanism, disposed between the first body and the second body, and comprising:
      a first rack plate, disposed on the first body,
      a second rack plate, disposed on the second body and aligned with the first rack plate,
      a first gear shaft, meshed with the first rack plate, and comprises a first gear, wherein the first gear has a first portion and a second portion, and
      a second gear shaft, meshed with the first gear shaft and the second rack plate, and comprises a second gear, wherein the second gear has a third portion and a fourth portion; and
   a cover, movably disposed on the hinge mechanism, covering the hinge mechanism, and abutting against the first body and the second body;
   wherein the first portion is meshed with the first rack plate and is aligned with the second gear shaft, the third portion is meshed with the second rack plate and is aligned with the first gear shaft, and the second portion of the first gear and the fourth portion of the second gear are meshed with each other,
   wherein, when the second body rotates relative to the first body, the second rack plate, the second gear shaft, the first gear shaft, and the first rack plate rotate in sequence, the first rack plate and the second rack plate abut against the cover, so the cover is away from the hinge mechanism and separated from the first body and the second body.

2. The foldable electronic device according to claim 1, wherein the hinge mechanism further comprises:
   a base, wherein the first rack plate and the second rack plate are movably disposed on the base, and the first gear shaft and the second gear shaft are pivoted within the base.

3. The foldable electronic device according to claim 2, wherein the base comprises a sliding groove, and the cover comprises a sliding shaft slidably disposed in the sliding groove.

4. The foldable electronic device according to claim 2, wherein the base comprises an arc-shaped guide groove, the first rack plate comprises a first arc-shaped guide portion, the second rack plate comprises a second arc-shaped guide portion, and the first arc-shaped guide portion and the second arc-shaped guide portion extend into the arc-shaped guide groove.

5. The foldable electronic device according to claim 1, wherein the first rack plate comprises a first plate portion; the second rack plate comprises a second plate portion; and the cover comprises a main body, a first abutting portion recessed in the main body and corresponding to the first plate portion, and a second abutting portion recessed in the main body and corresponding to the second plate portion.

6. The foldable electronic device according to claim 1, wherein the first gear shaft comprises a first shaft portion, and the first shaft portion is connected to the first gear, the second gear shaft comprises a second shaft portion, and the second shaft portion is connected to the second gear.

7. The foldable electronic device according to claim 1, wherein the first body comprises a first connecting portion; the second body comprises a second connecting portion; and the cover comprises a main body, a first supporting portion protruding from the main body and corresponding to the first connecting portion, and a second supporting portion protruding from the main body and corresponding to the second connecting portion.

8. The foldable electronic device according to claim 1, further comprising:
   an elastic element disposed between the hinge mechanism and the cover, wherein two ends of the elastic element are connected to the hinge mechanism and the cover respectively to constantly drive the cover to move close to the hinge mechanism.

9. The foldable electronic device according to claim 1, further comprising:
   a first screen pivotally connected to a side of the first body away from the cover, wherein the cover is adapted to connect to the first screen, so the first screen rotates; and
   a second screen pivotally connected to a side of the second body away from the cover, wherein the cover is adapted to connect to the second screen, so the second screen rotates.

10. The foldable electronic device according to claim 1, wherein the hinge mechanism further comprises:
    a base;
    a bracket pivotally connected to the base and connected to the first body or the second body, wherein the first body or the second body is adapted to rotate relative to the base; and
    a torsion element disposed on the base and connected to the bracket.

* * * * *